Jan. 22, 1957

L. D. STATHAM 2,778,623

ANGULAR ACCELEROMETER

Filed Dec. 29, 1952

INVENTOR.
LOUIS D. STATHAM
BY Philip Subkow
ATTORNEY

United States Patent Office 2,778,623
Patented Jan. 22, 1957

2,778,623

ANGULAR ACCELEROMETER

Louis D. Statham, Beverly Hills, Calif., assignor to Statham Laboratories, Inc., Los Angeles, Calif., a corporation of California Application December 29, 1952, Serial No. 328,416

9 Claims. (Cl. 264—1)

This application is a continuation-in-part of application Serial No. 241,539, filed August 13, 1951.

This invention relates to a motion responsive device for indicating and recording the magnitude and nature of motions of an object in space. It belongs to the general class of vibrometers, velocimeters, and accelerometers.

The conventional examples of such systems include devices in which a solid mass is suspended on springs and the nature and character of the displacement of the mass on the springs are a measure of the magnitude and nature of the motion.

Instead of using a solid mass suspended on springs, as in the prior art, I employ a liquid mass and measure displacement of the liquid mass relative to the container subjected to the motion to be sensed.

Since I use a liquid mass instead of a solid inertial mass, I may use a large mass without introducing a large hinge, such as would be necessary were I to use a solid mass of equivalent weight. Such a large weight would require a large hinge or pivots or springs in order to withstand mechanical shocks. By using a liquid mass as the effective inertial mass instead of a solid having a substantial inertial mass which is suspended on springs or pivots for deflection upon acceleration of the device, I avoid the difficulties introduced by springs, hinges or pivots of the character which must be used when the solid mass, which is mounted on springs, hinges or pivots, is of sufficient magnitude to constitute the effective inertial mass.

By placing a movable member mounted for motion relative to the liquid in the container, which then acts as the effective inertial mass, the relative motion of the liquid and the container wall will cause the movable member to be displaced, as a result of a difference in pressure on both sides of the movable member. The movable member is thus displaced in the direction of the flow of liquid relative to the container. The motion of the liquid in the container is damped by viscous drag of the liquid against the wall of the container as the liquid circulates in an endless path around the walls of the container.

In order to increase the damping effect, I have added an additional damping effect, by causing the fluid to flow through an orifice, so that an energy loss occurs on the passage of the liquid through the orifice as a result of the relative motion of the liquid and the container walls. The result of this arrangement not only gives an additional damping effect but has the property that it tends to maintain a more nearly constant damping coefficient for the instrument, notwithstanding temperature changes and consequent changes in viscosity of the liquid, than would be obtained if the orifice is not employed.

I accomplish this effect by providing a liquid container, which, upon displacement, will cause a relative displacement of the container and liquid. I interpose an orifice in the path of the liquid. Only a portion of the relative flow is through the orifice and the remaining flow is within the body of the container but not through the orifice. The displacement of the liquid in the container proper is damped by viscous drag in the container proper. The contribution to the damping of the instrument by the viscous drag of the liquid in the container proper increases with increase of viscosity of the liquid, and vice versa, but contribution to the damping of the instrument by the liquid in passing through the orifice decreases with increase in the viscosity.

In the preferred embodiment of my invention the sensing element responds to the pressure difference between two points in the fluid, which is caused to circulate within the vessel chamber, and a passage is provided for fluid to leak from the point of higher pressure to the point of lower pressure through an orifice. This leakage is placed to provide a parallel flow of liquid from one side to the other side of the orifice, and thus provide a continuous loop of liquid for circulation through the vessel chamber and orifice in addition to the circulation of liquid in the chamber from one side of the orifice to the other side of the orifice but not through the orifice.

In my application Serial 241,539, I have exemplified one form of this device in which a container has a barrier wall so constructed that the liquid, which is the effective inertial mass of the device, is forced to flow through an orifice in the barrier wall. By mounting a movable plate in the orifice so that a peripheral crack is obtained around the edge of the orifice and the edge of the plate, the difference in pressure resulting from the relative motion of the container and the liquid causes a displacement of the plate which may be sensed by any desired motion sensing means. The peripheral crack has the property, as described above, of reducing the fluctuations of damping coefficient resulting from viscosity changes of the liquid on fluctuation of temperature.

The invention of this application employs this principle, but embodies it in a device of great simplicity and ruggedness, suitable for measuring angular accelerations.

In the present form of my invention, I employ a paddle mounted in a container, so that the paddle may pivot. While I may position the paddle so that the edges of the paddle touch the walls of the container, leaving substantially no crack between the edge of the paddle and the wall, the result will be that the instrument will not be as efficiently damped as when a suitable space is left between the wall and the edge of the paddle adjacent the wall. In the form of my invention shown in this application, an edge or both edges of the paddle approach, but do not touch the adjacent wall of the container. The walls of the container adjacent the paddle edges are cylindrical and the paddle pivot is coaxial with the cylinder containing the said wall section adjacent the paddle edges. The edge of the paddle which is separated from the adjacent cylindrical wall of the container forms a crack of constant area as the paddle moves over the cylindrical wall section. The relative movement of the container wall and the liquid causes a motion through the orifice. As a result of the relative motion of the liquid and container, a couple is created which causes the paddle to pivot on its axis and this motion may be sensed by any suitable motion sensing device.

These and other objects of my invention will be further described in connection with the drawings, in which—

Figure 1:
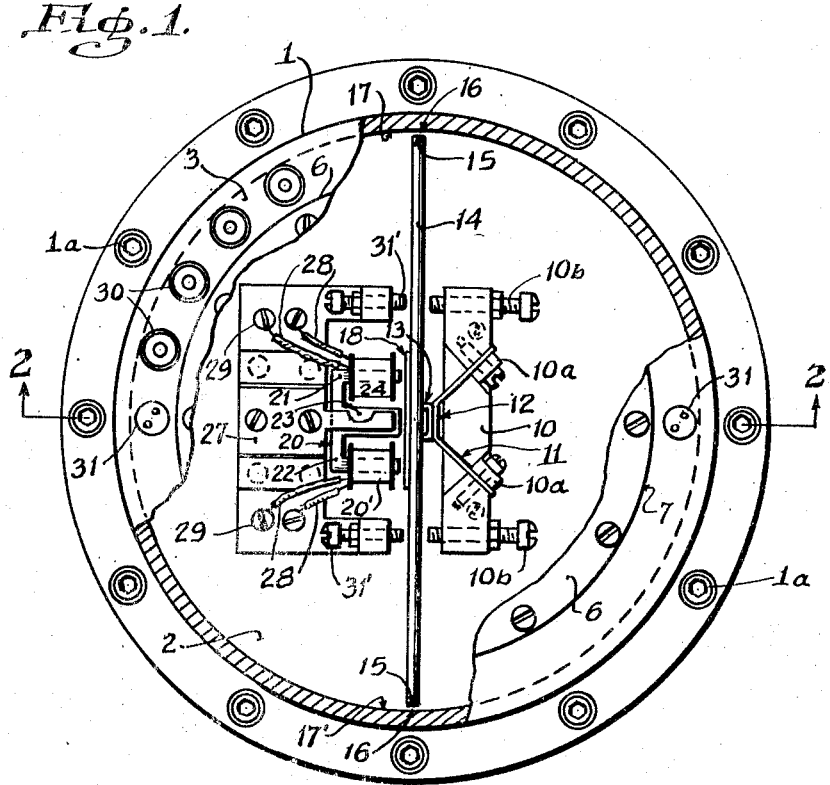
Fig. 1 is a plan view with parts broken away and parts in section.

The container 1 is shown as a cylinder, but may be of any shape provided that it is a closed container and has opposing cylindrical wall surfaces at the paddle edges, as will be described below. The container is closed by a bottom 2 suitably mounted in the container by studs 1a and gasket 1b, as shown, and the container is closed by the top 3. The top 3 carries an upstanding circular flange 4 on which is set the circular flange 7 depending from the cover 6. The flange 4 is connected to flange 7 by suitable studs 8, as shown. A flexible diaphragm 5 is clamped at its edges between the flanges 3 and 7 with suitable sealing gaskets 6a and extends across the entire area of the chamber 5a. Depending from the lower face of the top 3 is a bracket 9 carrying a baffle plate 9a abutting the underneath face of the top 3 and extending diametrically from wall section 17 to the wall section 17' of the container. Paddle 14 is placed directly underneath the baffle 9a, spaced therefrom, and extends diametrically of the cylindrical container. The paddle is in the shape of a channel member, for stiffness. The edges 15 of the paddle 14, as described above, may touch the adjacent wall sections 17 and 17' but be free to rotate over the wall. However, by spacing an edge from the adjacent wall the additional damping characteristics described above may be obtained. While a partial advantage is possible by spacing one of the edges of the paddle from the adjacent wall, leaving the other against the opposing wall, so that it may rotate over the wall, I prefer to space both paddle edges from the adjacent wall. In the preferred embodiment of my invention, for reasons stated above, one and preferably both edges 15 are spaced from the wall sections 17 and 17' to give an orifice 16 of size to give the damping effect as described above.

The paddle is mounted so as to pivot on the central axis of the container 1. The pivoted mounting shown in Figs. 1 and 2 consists of a bracket 10 having angularly placed lugs 10a. The bracket is mounted on the base 2. Clamped to the angular lugs is a V-shaped spring 11 having a planar base 12, the angles formed by the legs of the V and the base being equal. The base of the V is connected by soldering or any other suitable means to a U bracket 13 which is likewise connected to the channel face of the paddle 14 so as to put the central plane of the paddle face on the diametric plane of the cylindrical container. The flanges of the channel clear the bottom of the baffle 9a and the bottom 2 so that the paddle can pivot about the central axis of the container on the springs 11. The angular motion of the paddle is limited by means of two limit motion stop screws 10b which may be adjusted on the bracket 10. As will be seen from Figs. 1 and 2, the paddle and mounting are symmetrical and balanced about the horizontal and vertical axis through the pivot.

Mounted on the opposite face of the channel 14 is an armature 18 of a material having suitable magnetic permeability as, for example, an iron armature. The armature is in the form of a plate which extends across the axis of rotation of the paddle 14.

Figure 2:
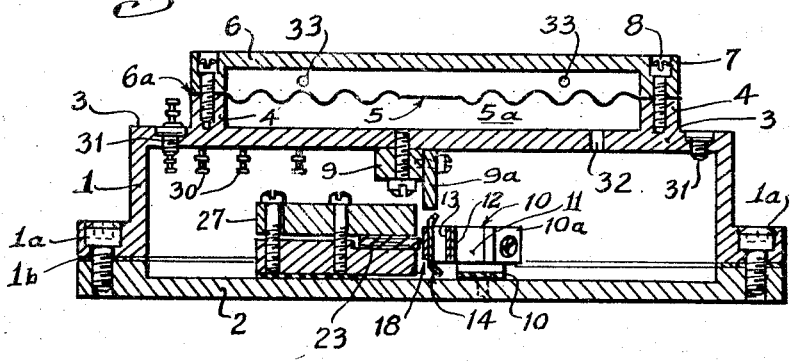
Fig. 2 is a section taken on line 2—2 of Fig. 1.

Mounted in front of the armature on a bracket 27 is an E-shaped iron core 20 having pole pieces 21, 22, and 23. The bracket is so positioned that the pole pieces are spaced from the armature 18. The core legs 21 and 22 have positioned thereon coils 24 and 20' connected by conductors 28 to terminals 29 in turn connected by conductors (not shown) to terminals 30 which extend through the top 3. Suitable motion limiting stop screws 31' pass through the bracket 27, as shown in Fig. 1.

Th case 1 may be filled with liquid through fill holes stoppered by screws 31 and the fluid enters and fills the chamber 5a underneath the diaphragm through ports 32. Suitable air breather holes 33 are provided in the flange 7. The paddle is thus immersed in the liquid and is thus buoyant as a result of the liquid volume displaced by the paddle. The effective inertial mass, as stated above, is thus the liquid rather than the paddle, and since the inertial mass of the paddle is thus low and may be made of the magnitude desired, this inertial mass may be made unsubstantial, permitting the use of weak spring suspensions as described above.

The liquid employed may be any liquid but, preferably, I select one having a high density and low viscosity or a high viscosity and low density to give the desired damping effect. While I may choose from a wide variety of liquids, I prefer to employ a liquid having a low viscosity temperature susceptibility and preferably also one having a low value of temperature coefficient of cubical expansion. A particularly useful liquid is the synthetic silicone polymers which have flat viscosity temperature lines on the American Society for Testing Materials chart.

While I do not wish to be bound by any dimensions and characteristics of the liquid and only for the purpose of illustrating one application of the principles of my invention, the following examples are given:

Thus, I may employ a paddle so designed as to given an edge orifice at the walls 17 and 17' having a height of about ½" and a spacing 16 from the wall of 0.050", and employ a silicone oil having a viscosity of 200 centipoises at 70° F. and a density of 1.

It will be observed that rotation of the container 1, upon about the central axis of the container, causes the paddle to deflect, causing the armature 18 to approach one of the pole pieces, for example 22, and depart from the pole piece 21, changing the air gap at the pole faces. This increases the reluctance in the magnetic path about the coil 24 and decreases the reluctance in the magnetic path about coil 20'. The resultant change in the inductance of the two coils may be measured by any conventional means and related to the angular motion of the paddle, as will be understood by those skilled in this art.

Instead of spacing one of the edges 15 from the container wall 17 or 17' so as to leave a throttling orifice, I may cut back one end of the paddle toward the pivot point to leave a large opening between the end of the paddle and one wall surface 17 or 17'. In fact, I may use only half of the paddle shown in Fig. 1 and end the paddle just the other side of the bracket 13, the edge 15 adjacent the wall section being adjacent either wall 17 or 17', as the case may be.

While I have disclosed an inductive type transducer as the motion sensing device, it will be understood by those skilled in this art that any other suitably designed transducer, such as an electrical resistance strain gage illustrated in application Serial No. 241,539, filed August 13, 1951, or other equivalent devices, may be used.

While I have described a particular embodiment of my invention for the purpose of illustration, it should be understood that various modifications and adaptations thereof may be made within the spirit of the invention as set forth in the appended claims.

I claim:

1. A motion sensing device comprising a case, a closed chamber in said case, said chamber being in the form of a cylinder and having opposing cylindrical walls, a liquid inertial mass in said chamber, a paddle in said chamber and immersed in said liquid, a hinge for said paddle, said hinge being connected to said paddle, a mounting for said hinge in said chamber, said mounting being connected to said case and to said hinge, said paddle being rotatably mounted about said hinge on the axis of said cylinder, for limited angular motion of said paddle about said axis and with respect to said case on angular acceleration of said case about said axis, said paddle extending from one wall to the opposing wall, opposing edges of said paddle being adjacent the opposing cylindrical walls, said hinge restraining motion of said paddle with respect to said case in the absence of angular acceleration of said case about said axis, and a motion sensing device connected to said paddle to sense the angular displacement of said paddle with respect to said case.

2. A motion sensing device comprising a case, a closed chamber in said case, said chamber being in the form of a cylinder and having opposing cylindrical walls, a liquid inertial mass in said chamber, a paddle in said chamber and immersed in said liquid, a hinge for said paddle, said hinge being connected to said paddle, a mounting for said hinge in said chamber, said mounting being connected to said case and to said hinge, said paddle being rotatably mounted about said hinge on the axis of said cylinder, for limited angular motion of said paddle about said axis and with respect to said case on angular acceleration of said case about said axis, said paddle extending from one wall to the opposing wall, opposing edges of said paddle being adjacent the opposing cylindrical walls, an edge of said paddle being spaced from the adjacent cylindrical wall of the case, said hinge restraining motion of said paddle with respect to said case in the absence of angular acceleration of said case about said axis, and a motion sensing device connected to said paddle to sense the angular displacement of said paddle with respect to said case.

3. A motion sensing device comprising a case, a closed chamber in said case, said chamber being in the form of a cylinder and having opposing cylindrical walls, a liquid inertial mass in said chamber, a paddle in said chamber and immersed in said liquid, a hinge for said paddle, said hinge being connected to said paddle, a mounting for said hinge in said chamber, said mounting being connected to said case and to said hinge, said paddle being rotatably mounted about said hinge on the axis of said cylinder, for limited angular motion of said paddle about said axis and with respect to said case on angular acceleration of said case about said axis, said paddle extending from one wall to the opposing wall, opposing edges of said paddle being adjacent the opposing cylindrical walls, an edge of each side of the paddle being spaced from the adjacent wall of the case, a baffle positioned in said chamber extending parallel to said paddle and spaced therefrom, said hinge restraining motion of said paddle with respect to said case in the absence of angular acceleration of said case about said axis, and a motion sensing device connected to said paddle to sense the angular displacement of said paddle with respect to said case.

4. A motion sensing device, comprising a case, a closed chamber in said case, a liquid inertial mass in said chamber, a paddle in said chamber immersed in said liquid, a mounting for said paddle fixedly mounted in said chamber and connected to said case, said paddle being movably mounted in said chamber with one edge of said paddle adjacent, but out of contact with, an enclosing wall of said chamber, the separation between the edge of the paddle and said wall forming a fluid communicating passageway, said paddle being positioned on said mounting for limited motion on said mounting with respect to said case on acceleration of said case, said mounting restraining motion of said paddle with respect to said case in the absence of acceleration of said case, and means for sensing said motion.

5. A motion sensing device, comprising a case, a closed chamber in said case, a liquid inertial mass in said chamber, a paddle in said chamber immersed in said liquid, a mounting for said paddle fixedly mounted in said chamber and connected to said case, said paddle being movably mounted in said chamber with one edge of said paddle adjacent, but out of contact with, an enclosing wall of said chamber, a baffle positioned in said chamber extending along said paddle and spaced therefrom, a liquid communication passageway for fluid movement from one side of said paddle to the other side of said paddle and between the edge of said paddle and said wall and between said paddle and said baffle, said paddle being positioned on said mounting for limited angular motion on said mounting with respect to said case on angular acceleration of said case, said mounting restraining motion of said paddle with respect to said case in the absence of angular acceleration of said case, and means for sensing said motion.

6. A motion sensing device, comprising a case, a closed chamber in said case, said chamber being in the form of a cylinder and having opposing cylindrical walls, a liquid inertial mass in said chamber, a paddle having an unsubstantial inertial mass when immersed in said liquid, a spring hinge for said paddle, said spring hinge being connected to said paddle, a mounting in said chamber for said hinge, said mounting being connected to said case and to said hinge, said paddle being rotatably mounted about said spring hinge on the axis of said cylinder for limited angular motion of said paddle about the said axis and with respect to said case on angular acceleration of said case, said hinge restraining motion of said paddle with respect to said case in the absence of angular acceleration of said case about said axis, said paddle extending from one wall to the opposing wall and immersed in said liquid, opposing edges of said paddle being adjacent the opposing cylindrical walls, and a motion sensing device connected to said paddle to sense the angular displacement of said paddle.

7. A motion sensing device, comprising a case, a closed chamber in said case, said chamber being in the form of a cylinder and having opposing cylindrical walls, a liquid inertial mass in said chamber, a paddle having an unsubstantial inertial mass when immersed in said liquid, a spring hinge for said paddle, said spring hinge being connected to said paddle, a mounting in said chamber for said hinge, said mounting being connected to said case and to said hinge, said paddle being rotatably mounted about said spring hinge on the axis of said cylinder for limited angular motion of said paddle about the said axis and with respect to said case on angular acceleration of said case, said hinge restraining motion of said paddle with respect to said case in the absence of angular acceleration of said case about said axis, said paddle extending from one wall to the opposing wall and immersed in said liquid, opposing edges of said paddle being adjacent the opposing cylindrical walls, an edge of said paddle being spaced from the adjacent cylindrical wall of the chamber, and a motion sensing device connected to said paddle to sense the angular displacement of said paddle.

8. A motion sensing device, comprising a case, a closed chamber in said case, said chamber being in the form of a cylinder and having opposing cylindrical walls, a liquid inertial mass in said chamber, a paddle having an unsubstantial inertial mass when immersed in said liquid, a spring hinge for said paddle, said spring hinge being connected to said paddle, a mounting in said chamber for said hinge, said mounting being connected to said case and to said hinge, said paddle being rotatably mounted about said spring hinge on the axis of said cylinder for limited angular motion of said paddle about the said axis and with respect to said case on angular acceleration of said case, said hinge restraining motion of said paddle with respect to said case in the absence of angular acceleration of said case about said axis, said paddle extending from one wall to the opposing wall and immersed in said liquid, opposing edges of said paddle being adjacent the opposing cylindrical walls, an edge of each side of the paddle being spaced from the adjacent wall of the chamber, a baffle positioned in said chamber extending parallel to said paddle and spaced therefrom, and a motion sensing device connected to said paddle to sense the angular displacement of said paddle.

9. In the device of claim 4, said paddle extending across said chamber with the opposite edges of said paddle adjacent but out of contact with an enclosing wall of such chamber and a baffle positioned in said chamber extending along said paddle and spaced therefrom, the space between said baffle and said paddle forming a fluid communicating passageway in said chamber from one side of said paddle to the other side.

References Cited in the file of this patent

UNITED STATES PATENTS

| | | |
|---|---|---|
| 1,305,961 | Burgess | June 3, 1919 |
| 2,225,716 | Sexton | Dec. 24, 1940 |
| 2,319,107 | Brandt | May 11, 1943 |
| 2,322,003 | Farmer | June 15, 1943 |
| 2,618,776 | Wiancko | Nov. 18, 1952 |

FOREIGN PATENTS

| | | |
|---|---|---|
| 2,173 | Great Britain | May 28, 1880 |